United States Patent
Corley et al.

(10) Patent No.: US 7,627,893 B2
(45) Date of Patent: Dec. 1, 2009

(54) METHOD AND SYSTEM FOR DYNAMIC ADJUSTMENT OF COMPUTER SECURITY BASED ON NETWORK ACTIVITY OF USERS

(75) Inventors: Carole R. Corley, Cedar Park, TX (US); Janani Janakiraman, Austin, TX (US); Lorin E. Ullman, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 735 days.

(21) Appl. No.: 11/255,153

(22) Filed: Oct. 20, 2005

(65) Prior Publication Data

US 2007/0094711 A1   Apr. 26, 2007

(51) Int. Cl.
G06F 7/04 (2006.01)
H04L 29/06 (2006.01)
G06F 17/00 (2006.01)
G06F 17/30 (2006.01)

(52) U.S. Cl. .................. 726/3; 726/1; 726/26; 726/27; 709/223; 713/1; 713/166

(58) Field of Classification Search .................. 713/166, 713/1; 726/3, 1, 26–27; 709/223
See application file for complete search history.

(56) References Cited

U.S. PATENT DOCUMENTS 6,047,262 A * 4/2000 Lutz ............................ 705/16
7,134,015 B2 * 11/2006 Kulack et al. ............... 713/166
2003/0110397 A1   6/2003 Supramaniam et al.
2003/0115484 A1 * 6/2003 Moriconi et al. ............. 713/201
2003/0130953 A1 * 7/2003 Narasimhan et al. .......... 705/59
2004/0039594 A1 * 2/2004 Narasimhan et al. ........... 705/1
2004/0162905 A1   8/2004 Griffin et al.

FOREIGN PATENT DOCUMENTS

| WO | 03029941 A2 | 4/2003 |
| WO | 03060800 A2 | 7/2003 |
| WO | 03084170 A1 | 10/2003 |
| WO | 2004063960 A1 | 7/2004 |

* cited by examiner

*Primary Examiner*—Christopher A Revak
*Assistant Examiner*—Trang Doan
(74) *Attorney, Agent, or Firm*—Yee & Associates, P.C.; Jeffrey S. LaBaw

(57) ABSTRACT

A method, system, apparatus, or computer program product is presented for securing computational resources in a data processing system. A first user uses a first computational device, and a user security level is associated with the first user. Likewise, a second user uses a second computational device, and a user security level is associated with the second user. The computational resources on the first computational device are automatically reconfigured based on the second user security level of the second user. A computational security level may be assigned to a computational resource on the first computational device, and the computational security level is dynamically adjusted in response to detected network activity by the second computational device that is being used by the second user. Modified security-related parameters for reconfiguring computational resources on the first computational device are reconfigured based on the adjusted computational security level.

1 Claim, 6 Drawing Sheets

METHOD AND SYSTEM FOR DYNAMIC ADJUSTMENT OF COMPUTER SECURITY BASED ON NETWORK ACTIVITY OF USERS

BACKGROUND OF THE INVENTION

1. Field of the Invention

The present invention relates to an improved data processing system and, in particular, to a method and apparatus for computer security.

2. Description of Related Art

Computer security tools provide defensive mechanisms for limiting the ability of malicious users to cause harm to a computer system. Software-based intrusion detection applications can alert a computer administrator to suspicious activity so that the administrator can take actions to track suspicious computer activity and to modify computer systems and networks to prevent security breaches.

Many security breaches to computer systems, however, occur through neglect or forgetfulness of human beings that render computer systems physically vulnerable because they are physically available for unauthorized use. For example, a user may remain logged on to a computer workstation while away for lunch, and the unattended computer in the user's office is open for use by unauthorized persons. Even though a user's account or device may automatically logoff after a certain period of inactivity, there remains a period of time during which an unauthorized person may gain access to the user's account for malicious activity. Similar situations require greater physical control over vulnerable devices.

In addition to asserting better security practices over unattended devices, there are many situations in which security practices could be improved over attended devices, i.e. computational resources that are actively being used by someone yet still need to be protected from unauthorized use or observance. For example, some organizations, particularly government agencies and military departments, implement various types of security procedures over personnel. Different individuals within a single organization have different duties, and various levels of security clearance or various types of compartmentalized security access are given to individuals within the same organization in accordance with the duties of those individuals. In many cases, two persons within the same organizational unit might not be authorized to view the information that is handled by each other. These organizations can implement different security procedures over computer systems that reflect security procedures that are applied to different personnel; for example, each person is only authorized to access the computational resources that are necessary for his or her particular job.

Although many security breaches to computer systems occur through neglect or forgetfulness of human beings that render the computer systems physically vulnerable, many security breaches occur when human beings render those computer systems computationally vulnerable through risky computational activities. These risky computational activities increase the chances that a computer will be subject to a malicious attack or computer virus infestation. Many risky computational activities are performed knowingly. In some cases, risky computational activities are performed knowingly in an authorized manner, while unfortunately in many other cases, risky computational activities are performed knowingly in an unauthorized, negligent, or reckless manner.

For example, a person may frequently operate a computer without an active firewall. Even though certain security procedures can be automatically implemented to prevent such situations, a person may require a specifically configured computer that is unencumbered by certain computational security defenses. In some situations, in order for an employee to perform a specific work task, the employee may require a specific computer configuration, such as an inactive or disabled firewall. Hence, this person may operate the computer without an active firewall in an authorized manner. In other situations, though, a person may frequently disable a firewall in order to illegally downloading music or video content, which may be some of the activities that would be prevented by the firewall. Hence, this person may operate the computer without an active firewall in an unauthorized manner. Moreover, the computer may also be rendered vulnerable by a failure to check the downloaded files for viruses.

Even though a person may actively thwart computer security defense mechanisms in an unauthorized manner, there may be legitimate reasons for tolerating certain computer vulnerabilities with respect to the computational activities of some persons. In these types of situations, as noted above, an organization can implement different security procedures over computer systems that reflect security procedures that are applied to different personnel. However, the computational activities of one person may render the computational activities of another person vulnerable because most computers operate within a networked data processing system, and many malicious vulnerabilities, e.g., viruses, can be spread through network connections from computer to computer.

Hence, there is a need to ensure that the activities of one user within a networked computational environment do not jeopardize the activities of another user. More specifically, there is a need to ensure that a computational vulnerability that is tolerated by a first user, whether authorized or unauthorized, does not introduce problems into a networked computational environment, particularly in those cases in which the computational vulnerability can spread to a second user's computer that was actively attempting to defend itself against the computational vulnerability.

Therefore, it would be advantageous to improve computational security over a data processing system by allowing computer security procedures to continue to be implemented in a flexible manner with respect to different users yet ensuring that the computer security procedures that are implemented or activated with respect to one user do not cause computational vulnerabilities for another user.

SUMMARY OF THE INVENTION

A method, system, apparatus, or computer program product is presented for securing computational resources in a data processing system. A first user uses a first computational device, and a user security level is associated with the first user. Likewise, a second user uses a second computational device, and a user security level is associated with the second user. The computational resources on the first computational device are automatically reconfigured based on the second user security-level of the second user. A computational security level may be assigned to a computational resource on the first computational device, and the computational security level is dynamically adjusted in response to detected network activity by the second computational device that is being used by the second user. Modified security-related parameters for reconfiguring computational resources on the first computational device are reconfigured based on the adjusted computational security level.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
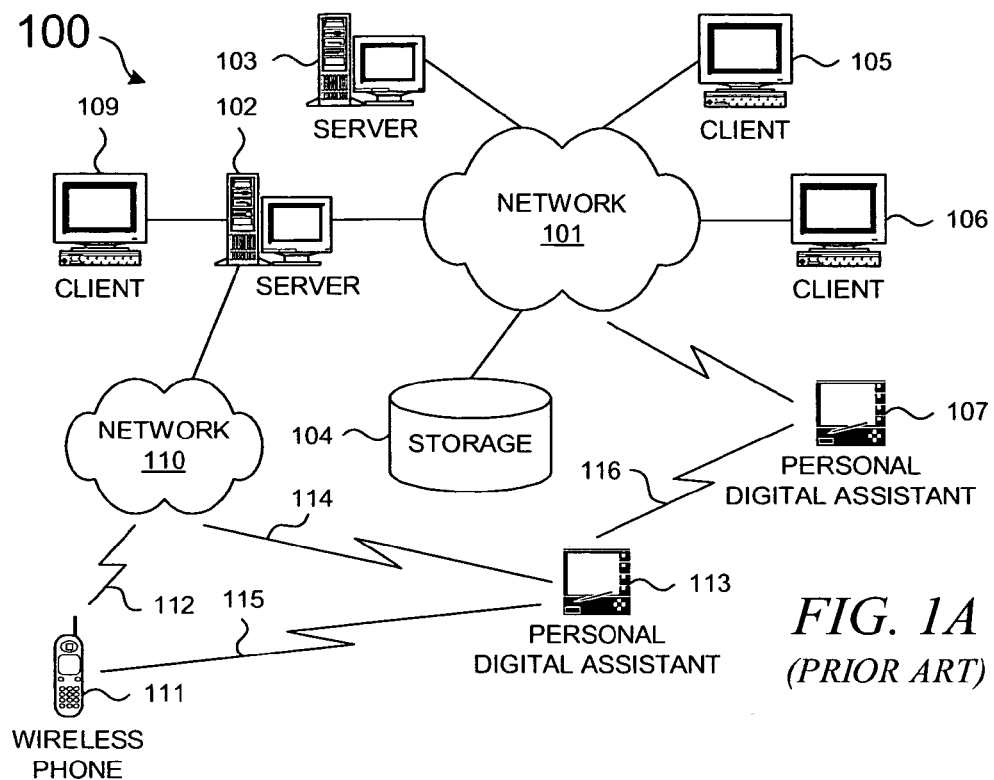
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
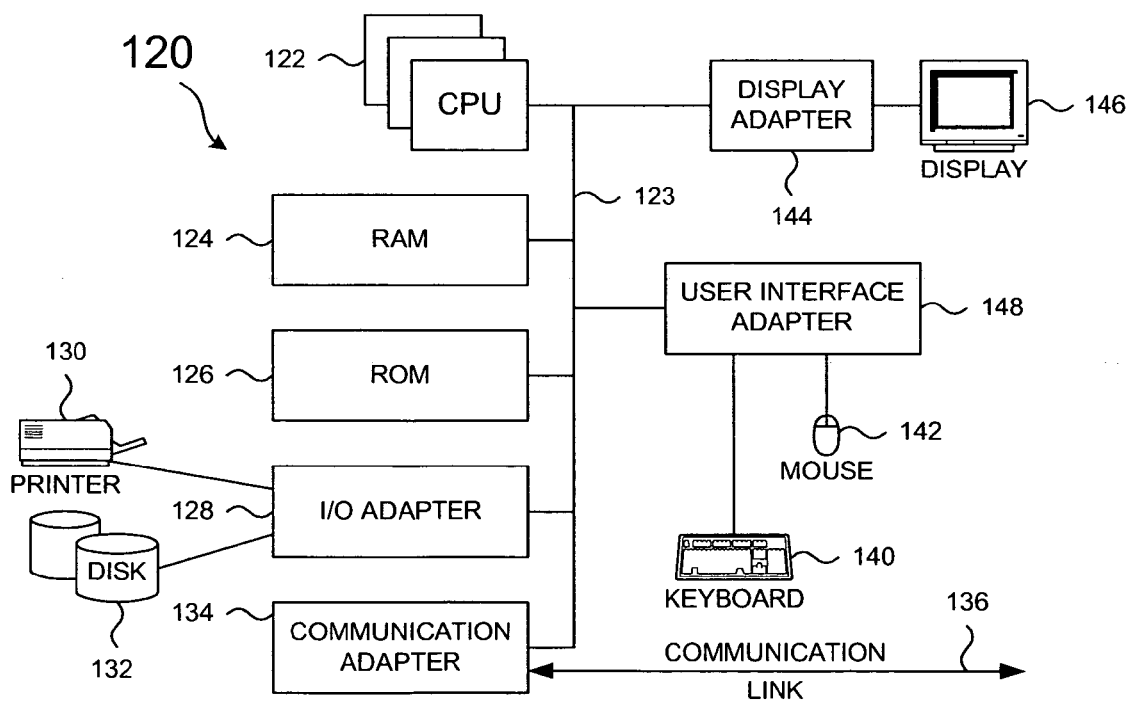
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to improved security processes within a data processing environment. Prior to describing the present invention in more detail, some aspects of a typical data processing environment that supports security operations are described.

Figure 2:
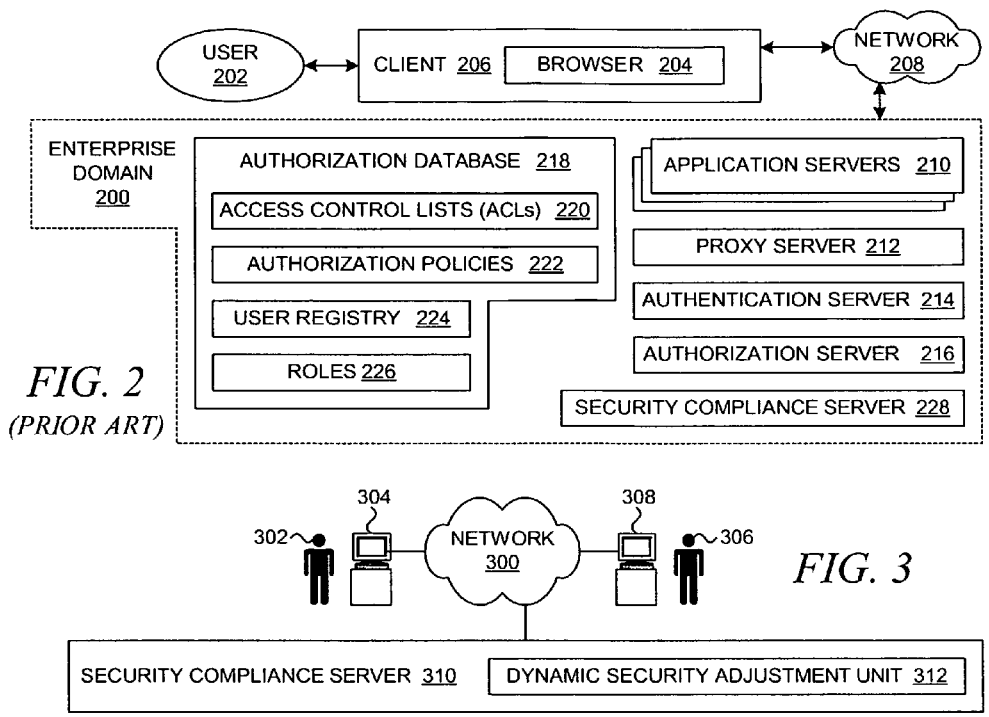
FIG. 2 depicts a block diagram that shows a typical enterprise data processing system.

With reference now to FIG. 2, a block diagram depicts a typical enterprise data processing system. Whereas FIG. 1A depicts a typical data processing system with clients and servers, in contrast, FIG. 2 shows a client within a network in relation to some of the server-side entities that may be used to support client requests to access resources. As in a typical computing environment, enterprise domain 200 hosts resources that user 202 can access, e.g., by using browser application 204 on client 206 through network 208; the computer network may be the Internet, an intranet, or other network, as shown in FIG. 1A.

Enterprise domain 200 supports multiple servers. Application servers 210 support controlled and/or uncontrolled computational resources through web-based applications or other types of back-end applications, including legacy applications. Reverse proxy server 212, or more simply, proxy server 212, performs a wide range of functions for enterprise domain 200. For example, proxy server 212 may cache web pages in order to mirror the content from an application server. Incoming and outgoing datastreams may be processed by an input datastream filter and output datastream filter in order to perform various processing tasks on incoming requests for computational resources and outgoing responses from computational resources in accordance with goals and conditions that are specified within various policies or in accordance with a configuration of deployed software modules.

Proxy server 212 may contain a session management unit that manages session identifiers, cached credentials, or other information with respect to sessions as recognized by proxy server 212. Web-based applications typically utilize various means to prompt users to enter authentication information, often as a username/password combination within an HTML form. In the example that is shown in FIG. 2, user 202 may be required to be authenticated before client 206 may have access to resources, after which a session is established for client 206. In an alternative embodiment, authentication and authorization operations are not performed prior to providing a user with access to resources on domain 200; a user session might be created without an accompanying authentication operation.

The above-noted entities within enterprise domain 200 represent typical entities within many computing environments. However, many enterprise domains have security features for controlling access to protected computational resources. A computational resource may be an electronic data processing device/subsystem/system, an application, an object, an executable code module, a document, a web page, a file, a database, a database record, various other types of functional units, various other types of information units, or various types of communication functions. A protected or controlled computational resource is a computational resource that is only accessible or retrievable if the requesting client or requesting user is authenticated and/or authorized; in some cases, an authenticated user is, by default, an authorized user.

Authentication server 214 may support various authentication mechanisms, such as username/password, X.509 certificates, or secure tokens; multiple authentication servers could be dedicated to specialized authentication methods. Authorization server 216 may employ authorization database 218, which contains information such as access control lists 220, authorization policies 222, information about users within user registry 224, and information about user groups or roles 226. Using this information, authorization server 216 provides indications to proxy server 214 whether a specific request to access a computational resource should be allowed to proceed, i.e. whether access to a controlled computational resource should be granted in response to a request from client 206. Security compliance server 228 enforces IT security and other governance activities that are associated with users and their systems.

As noted above, many security breaches occur when human beings render computer systems computationally vulnerable through risky computational activities. These risky computational activities increase the chances that a computer will be subject to a malicious attack or computer virus infestation. Although an organization can implement different security procedures over different computer systems that reflect security procedures that are applied to different personnel, there may be legitimate reasons for tolerating certain computer vulnerabilities with respect to the computational activities of some persons. However, the computational activities of one person may weaken the security over the computational activities of another person because most computers operate within a networked data processing system, and many malicious vulnerabilities, e.g., viruses, can be spread through network connections from computer to computer. Hence, there is a need to ensure that the activities of one user within a networked computational environment do not jeopardize the activities of another user. More specifically, there is a need to ensure that a computational vulnerability that is tolerated by a first user, whether authorized or unauthorized, does not introduce problems into a networked computational environment, particularly in those cases in which the computational vulnerability can spread to a second user's computer that was actively attempting to defend itself against the computational vulnerability. The present invention provides a solution for dynamically adjusting security over the computational activities of one user based on the networked computational activities of another user, as described in more detail below with respect to the remaining figures.

Figure 3:
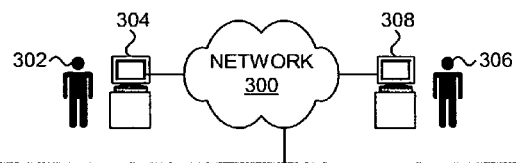
FIG. 3 depicts a block diagram that shows an overview of a data processing system that incorporates the dynamic security adjustment features of the present invention.

With reference now to FIG. 3, a block diagram depicts an overview of a data processing system that incorporates the dynamic security adjustment features of the present invention. A data processing system contains network 300; network 300 may be similar to network 101 or 110 in FIG. 1 or network 208 in FIG. 2, or network 300 may represent an entirely private network contained within an enterprise domain. User "A" 302 accesses computing device 304 that is connected to network 300, and user "B" 306 accesses computing device 308 that is also connected to network 300; computing devices 304 and 308 may represent a wide variety of computational devices, such as desktop computers, PDAs, cell phones, etc.

The data processing system also contains security compliance server 310, which supports dynamic security adjustment unit 312. Security compliance server 310 represents any appropriate server that contains security-related enforcement functionality, which alternatively be could be integrated within an authorization server, a network management server, or some other type of server or application that assists in the administrative management of the data processing system.

Dynamic security adjustment unit 312 represents functionality for performing the present invention. In a manner similar to that which is applicable to security compliance server 310, dynamic security adjustment unit 312 may be integrated within any appropriate server that contains security-related enforcement functionality or within an authorization server, a network management server, or some other type of server or application that assists in the administrative management of the data processing system. As noted above, the present invention is directed to a process or a system for dynamically adjusting security over the computational activities of one user based on the networked computational activities of another user; dynamic security adjustment unit 312 performs these operations as necessary.

For example, user "A" 302 accesses computational resources via computing device 304. Security-related information is maintained about the software and hardware computational resources of computing device 304 that reflects the restrictiveness, or from an opposite perspective, the leniency, of the security operations or parameters that are applied against the current operational activities of the computational resources that are supported by computing device 304, which may be specifically referred to as the computational security level of computing device 304. Likewise, security-related information would be maintained about other active computational devices within the data processing system. The computational security level may also be regarded as a metric that is related to the vulnerability of the computational resources on computing device 304 to errant computational operations that might be caused on computing device 304 by activities that are exterior to computing device 304 but within the data processing system. These errant computational operations might be caused by a user with malicious intent, or these errant computational operations could be caused inadvertently through the unauthorized activities of a negligent or reckless user; alternatively, these errant computational operations might be inadvertently caused through the authorized activities of a user. As explained in more detail below, the computational security level may be computed using information from a variety of sources, and the computation of a computational security level may be guided by conditions and/or rules that are specified within configurable policies.

Security-related information is also maintained about the usage of software and hardware computational resources by users of the data processing system, which may be specifically referred to as a user security level for a specific user. For example, user "A" 302 is associated with a user security level that is assessed from information about the activities of user "A" 302; likewise, security-related information would be maintained about other users within the data processing system. The user security level reflects the trustworthiness, or from an opposite perspective, the behavioral risk, of a user with respect to the user's requests for operational activities of the computational resources that are supported within the data processing system. The user security level may also be regarded as a metric that is related to the ability of a user to induce errant computational operations on computing devices by activities within the data processing system. These errant computational operations might be caused by a user with malicious intent, or these errant computational operations could be caused inadvertently through the unauthorized activities of a negligent or reckless user; alternatively, these errant computational operations might be inadvertently caused through the authorized activities of a user. As explained in more detail below, the user security level may be computed using information from a variety of sources, and the computation of a user security level may be guided by conditions and/or rules that are specified within configurable policies.

Dynamic security adjustment unit 312 is responsible for dynamically managing user security levels that are associated with users of the data processing system and for dynamically managing computational security levels that are associated with computational resources within the data processing system. Referring again to the example that is shown in FIG. 3, while user "A" 302 is employing computing device 304, user "B" 306 may logon onto network 300 via computing device 308 and then begin to access resources through network 300. User "A" 302 may possess a user security level that reflects greater trustworthiness than the user security level of user "B" 306, and the presence of computational activities on network 300 by user "B" 306 may pose vulnerabilities to the computational activities on network 300 by user "A" 302. In response, dynamic security adjustment unit 312 may dynamically adjust the computational security level that is applied to computing device 304, thereby protecting the computational operations and activities of user "A" 302, as explained in more detail below.

Figure 4A:
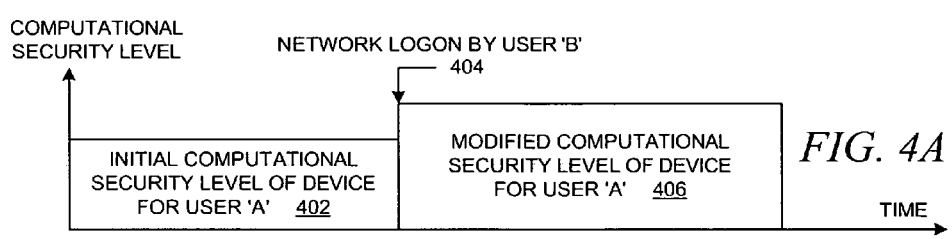
FIGS. 4A-4B depicts a pair of timelines that show the dynamic adjustment of a computational security level of a device in accordance with the present invention.
Figure 4B:
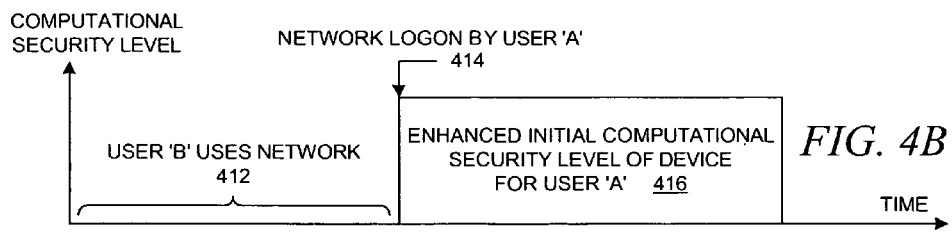

With reference now to FIGS. 4A-4B, a pair of timelines show the dynamic adjustment of a computational security level of a device in accordance with the present invention. Referring to FIG. 4A, user "A" has previously logged onto a data processing system and/or its network through an authentication operation, e.g., by presenting a smart card device as a security token that asserts an identity for the user. User "A" continues to employ a computing device and associated computational resources for some period of time 402 during which the data processing system has assigned a computational security level to the computing device and/or computational resources that are supported by the computing device.

At some point in time 404, user "B" logs onto the same data processing system and/or network. From a qualitative perspective, the user security level of user "B" is examined, and a determination is made that user "B" poses a potential vulnerability to the activities of user "A". Therefore, a determination is made to enhance the security precautions that are applied to the computing device that is being used by user "A", thereby hopefully preventing user "B" from performing an activity that harms the activities of user "A".

From a computational or quantitative perspective, user "B" can be described as having been assigned a relatively low user security level, e.g., lower than the user security level of user "A". In response, the data processing system dynamically adjusts the computational security level of the computing device that is being used by user "A" based on the user security level of user "B". The newly assigned computational security level remains in effect for some period of time 406 until it is changed again or until user "A" logs out of the network or the data processing system.

In the example that is shown in FIG. 4A, the computational security level of the computing device that is being used by user "A" is enhanced from time period 404 to time period 406. In this manner, the computational security level of the computing device that is being used by user "A" can be described as being inversely related, although not necessarily inversely proportional, to the user security level of user "B". Hence, as shown in FIG. 4A, the fact that user "B" is said to have a low user security level causes a response that enhances the computational security level of the computing device that is being used by user "A" from time period 404 to time period 406.

Referring to FIG. 4B, a different timeline is shown. Before time period 412, user "B" has previously logged onto a data processing system and/or its network through an authentication operation, e.g., by using a smart card device as a security token or by completing an authentication challenge, such as entering a username and an associated password. User "B" continues to employ a computing device and associated computational resources for some period of time 412.

At some point in time 414, user "A" logs onto the same data processing system and/or network. In response, a determination is made as to whether or not the computational security level that is applied to computing device of user "A" should be enhanced or not. The user security level of user "B" is examined, and a determination is made that user "B" poses a potential security vulnerability to the activities of user "A".

In a scenario in which user "B" is not using the network when user "A" logs onto the network, e.g., as shown in FIG. 4A, the data processing system would assign an initial computational security level to the computing device of user "A" and/or computational resources that are supported by the computing device; the initial computational security level would reflect the lack of a security vulnerability because user "B" is not logged onto the network or the data processing system.

However, given that user "B" is already logged onto the network at time 414 when user "A" logs onto the network, the data processing system dynamically assigns a relatively enhanced computational security level to the computing device that is being used by user "A" based on the user security level of user "B". The newly assigned, relatively higher, computational security level remains in effect for some period of time 416 until it is changed again or until user "A" logs out of the network or the data processing system.

In other words, in the example that is shown in FIG. 4B, the computational security level of the computing device that is being used by user "A" is initially assigned during time period 416 based on the user security level of user "B". In this manner, the computational security level of the computing device that is being used by user "A" can be described as being inversely related, although not necessarily inversely proportional, to the user security level of user "B". Hence, as shown in FIG. 4B, the fact that user "B" is said to have a low user security level causes a response that enhances the computational security level of the computing device that is being used by user "A" during time period 416.

Figure 4C:
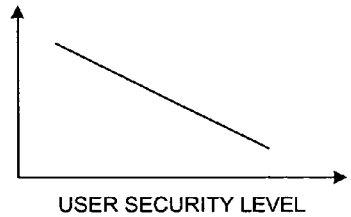
FIGS. 4C-4D depict diagrams that show the inverse relationship between a user security level of a given user and a computational security level of a given computational resource.
Figure 4D:

With reference now to FIGS. 4C-4D, a pair of diagrams depict the inverse relationship between a user security level of a given user and a computational security level of a given computational resource. The diagrams show a user security level for a given user as a variable along a horizontal axis and a computational security level for a given computational resource as a variable along a vertical axis. With respect to the horizontal axis, when a given user is qualitatively assessed as being a security risk or vulnerability, the given user is quantitatively assigned a lower numerical user security level. With respect to the vertical axis, when a given resource is assessed as being vulnerable to the activities of a given user, the given resource is qualitatively assessed as requiring a heightened level of security, and the given resource is quantitatively assigned a higher numerical computational security level.

The representation in the diagrams of the inverse relationship shows that a user that presents a higher security risk, or equivalently, a lower level of security trustworthiness, requires the assertion of a higher or more thorough security response or defense to the given computational resource. As the user security level for a given user is increased, the computational security level for a given computational resource is decreased.

Hence, in an implementation of the present invention, a computational security level for a given computational resource is inversely related to the user security level for a given user; the inverse relationship is illustrated in the diagrams in different ways. Referring to FIG. 4C, this inverse relationship is shown as a monotonic function; in an embodiment of the present invention, the inverse relationship may be implemented as a configurable function that inversely relates the variables. Referring to FIG. 4D, this inverse relationship is shown as a series of discrete points; in an embodiment of the present invention, the inverse relationship may be implemented as a function that is defined through a lookup table. Other methods for mapping a user security level to a computational security level may also be implemented.

Figure 5:
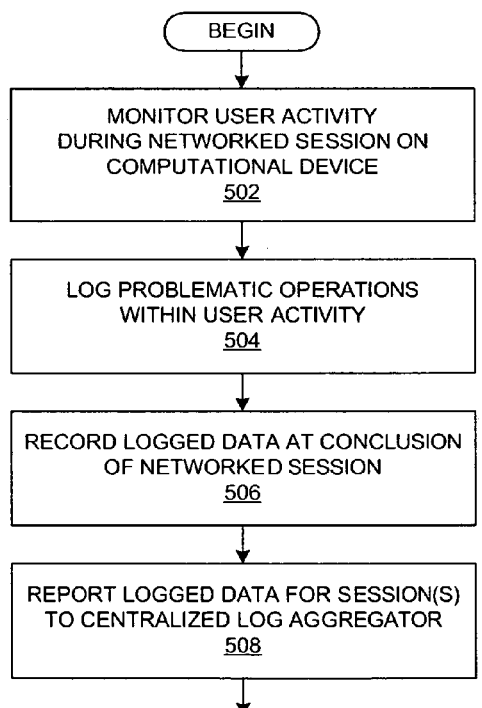
FIG. 5 depicts a flowchart that shows a process for gathering information that influences the determination of a user security level in accordance with an embodiment of the present invention.

With reference now to FIG. 5, a flowchart depicts a process for gathering information that influences the determination of a user security level in accordance with an embodiment of the present invention. The process commences after a user of a data processing system has logged onto a computing device within the data processing system, and the data processing system begins to monitor the network operations or other activities of the user as the user accesses computational resources (step 502). The monitoring operation may be performed on the computational device on which the user interacts with a computer-human interface, or the monitoring operation may be performed elsewhere within the network at any point at which the user's activity can be monitored.

The monitoring operation continues during the user's session, and any network-related operations or other activities that are determined to be at-risk security-related activities are logged locally (step 504), e.g., within a local cache. The determination of operations that are potentially problematic from a security viewpoint can be predetermined and/or configurable through a policy database, thereby allowing certain problematic operations to be tagged as such while filtering all potentially problematic operations or suspicious activities in accordance with configurable rules or conditions as specified in a policy, as described in more detail below. When the user's session is terminated, and the logged activity during the session is stored in an appropriate datastore (step 506).

At some point, the logged activity during a session or over a number of sessions are reported to a centralized database for storage and processing (step 508), and the process is concluded. The logged information may be reported in a variety of manners, e.g., immediately, periodically, in accordance with a schedule, or in response to a prompt to do so. Alternatively, the process may be performed in a real-time fashion such that detections of potentially problematic operations or suspicious activities are reported to a central location when they are detected and then logged within a centralized datastore.

Figure 6:
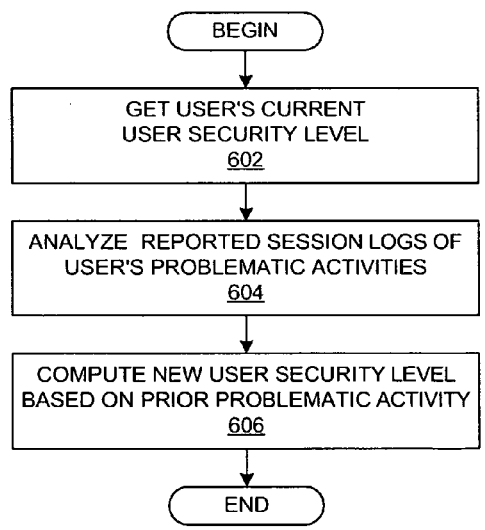
FIG. 6 depicts a flowchart that shows a process in which previously logged user activity is analyzed to influence the determination of a user security level for a specific user in accordance with an embodiment of the present invention.

With reference now to FIG. 6, a flowchart depicts a process in which previously logged user activity is analyzed to influence the determination of a user security level for a specific user in accordance with an embodiment of the present invention. The process commences by retrieving the current value for the user security level of a specific user (step 602). The process that is shown in FIG. 6 depicts an update operation for the user security level of a specific user; however, a similar process would be performed for generating an initial value for the user security level of a specific user, e.g., when a new user has been registered within the data processing system, by associating an empty session log with the user and then acting as if the user's networked activity has been monitored for at least one session that resulted in an empty set of problematic activity.

The recorded session log or logs of the particular user's potentially problematic operations or suspicious activities are then compiled and analyzed (step 604), and a new or modified user security level for the particular user is computed (step 606) and then associatively stored with other information about the user, thereby concluding the process. The analysis of problematic security-related operations can be performed in accordance with a predetermined and/or configurable algorithm using controlling input parameters or in accordance with various configurable conditions and/or rules; configuration information for the analysis may be retrieved from a policy in a policy database, as described in more detail below.

Figure 7A:
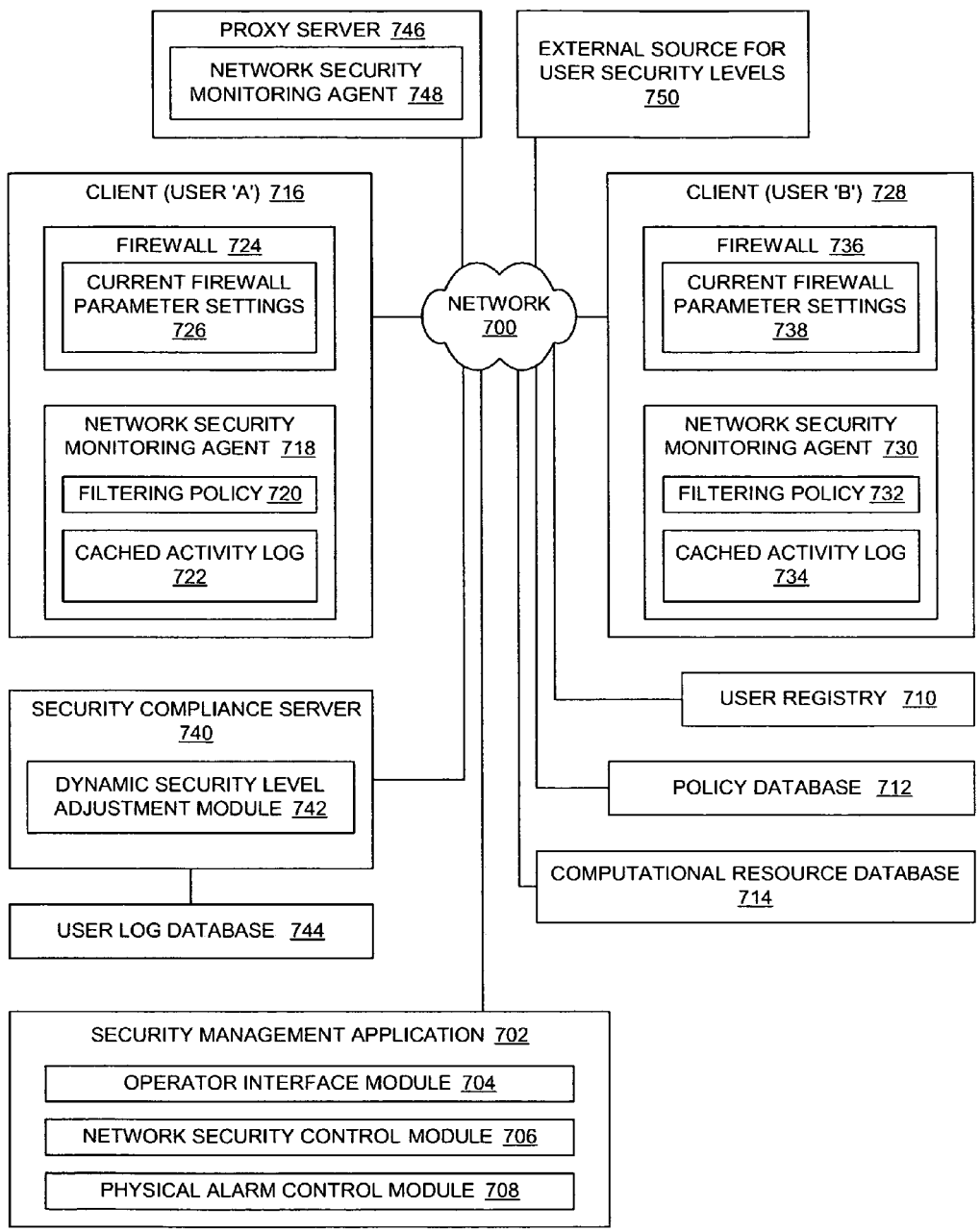
FIGS. 7A-7G depicts a set of block diagrams that show components in a data processing system for supporting the dynamic adjustment of security levels.

With reference now to FIGS. 7A-7G, a set of block diagrams depict components in a data processing system for supporting the dynamic adjustment of security levels in accordance with an embodiment of the present invention. Referring now to FIG. 7A, network 700 supports multiple computational devices and software applications. Security management application 702 provides centralized control for supporting administrative actions with respect to physical security operations and computational security operations. Security management application 702 resides within a larger data processing system, some of which is not shown in the figure. For example, authentication servers verify identities of users of the data processing system. Application servers provide support for executing applications that are used by those users. Authorization servers determine whether or not a user is authorized to access a computational resource, such as an application server.

Security management application 702 integrates operations from various types of security subsystems. Security management application 702 contains various types of components or modules for supporting specific aspects of its operations. Operator interface module 704 supports a user interface for an administrative user. Network security control module 706 supports specific operations with respect to network security. Physical alarm control module 708 provides support for reporting and canceling physical alarms. Security management application 702 may require the input of various types of data that may be stored in any appropriate datastore: user registry 710; policy database 712; and computational resource database 714, each of which are described in more detail below.

In a manner similar to FIG. 3, network 700 supports two computational devices that are configured to interact with a security compliance server. Client 716 contains network security monitoring agent 718, which contains a copy of filtering policy 720 and cached activity log 722. Client 716 also contains a typical firewall 724, which has configurable firewall parameter settings 726. In a similar manner, client 728 contains network security monitoring agent 730, which contains a copy of filtering policy 732 and cached activity log 734. Client 728 also contains a typical firewall 736, which has configurable firewall parameter settings 738. Network security monitoring agent interact with security compliance server 740, which supports dynamic security level adjustment module 742, which maintains user log database 744. It should be noted that information about network-related activities can be gathered from additional sources within the data processing system. For example, proxy server 746 also contains network security monitoring agent 748.

As described above with respect to FIG. 5 and FIG. 6, client 716, client 718, and other similarly configured computational devices within the data processing system interact with security compliance server 740 to gather information about network-related activities by users of those computational devices. For example, security compliance server 740 configures client 716 by sending network security monitoring agent 718 a copy of filtering policy 720, which contains rules and/or conditions to be checked against the network-related activities of client 716 while a specific user, e.g., user "A", is operating client 716. Potentially problematic activity is recorded within cached activity log 722, which is occasionally sent to dynamic security level adjustment module 742 to be compiled into user log database 744. Network security monitoring agent 718 may monitor network operations directly, or network security monitoring agent 718 may monitor network operations indirectly by gathering logged information from other sources that monitor network operations directly, such as firewall application 724.

Although FIGS. 5 and 6 describe processes for gathering information that is used to compute a user security level, the present invention may also obtain or retrieve a user security level from elsewhere, including external source 750. The external source may be a database or similar datastore that contains user security levels for many people. The external source may be operated by a government agency, e.g., a law enforcement agency that maintains information on convicted criminals, particularly criminals who have been found guilty of computer-related crimes. In other instances, the external source may be a commercial company that provides electronic information services on a paid-fee basis. In any case, a user security level can be obtained from an external source, which might be used in addition to information that is gathered within the data processing system, or possibly relying on the external source and thereby negating the need for the data processing system to determine a user security level by filtering network-related activity.

Figure 7B:
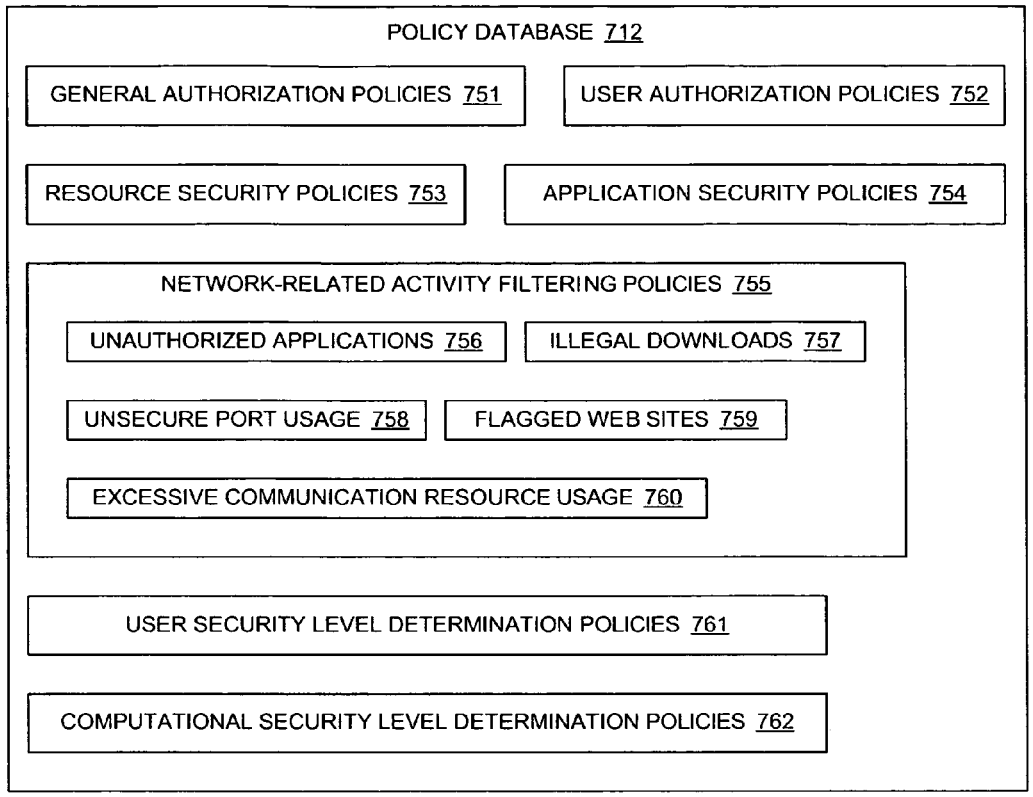

Referring now to FIG. 7B, policy database 712 contains additional detail for some of the policies that may be used to guide operations with respect to security levels. Policy database 712, which may be accessed by security compliance server 702 as well as other servers, such as an authorization server, contains various types of policies that are configurable to control the operation of various aspects of the overall data processing system. In general, a policy specifies a rule or a condition to be checked against a set of input parameters in order to determine whether a specified action should be taken when an given event occurs or when warranted circumstances arise. The illustrated policies are merely exemplary, and other policies could be stored in policy database 712.

General authorization policies 751 may apply to all users, e.g., various enterprise-wide policies pertaining to work schedules. User authorization policies 752 may contain unique policies for persons, e.g., a particular policy would only apply to a given person, thereby enabling the system management application to handle needs of employees or other persons on an individual basis. Resource security policies 753 are policies that pertain to conditions over various aspects of a device and its resources and the manner in which access to certain resources on the device can be granted or denied based on a computational security level. Application security policies 754 are policies that pertain to conditions over various software applications and the manner in which access can be granted denied to the application.

Network-related activity filtering policies 755 are used to filter network-related operations in order to determine whether or not a network-related operation poses a security vulnerability to the data processing system; if so, then the activity is logged and reported. For example, policies for unauthorized applications 756 detect whether an unauthorized application is executing on a computational device and/or accessing the network from the computational device; an unauthorized application that is installed on a device has not been thoroughly examined or tested to determine whether or not its behavior may cause device-specific or network-wide security problems. Policies for illegal downloads 757 detect whether a computational resource is being used to illegally download content from a network, e.g., specifically music or video content from the Internet. Policies for unsecure port usage 758 detect whether various ports on a computational device have been opened and/or used for communication, which is known to occur in a variety of malicious attacks and may indicate the presence of malicious software on a device. Policies for flagged web sites 759 detect whether a device is being used to access web sites on the Internet that have been specifically flagged as being off-limits to users. Policies for excessive communication resource usage 760 detect whether a device is being used on the network in an excessive manner, which may indicate usage of a device or a resource for unauthorized activity.

User security level determination policies 761 are employed to compute a user security level for a user based on logged information about the network-related activities of the user, as described in more detail below. Computational security level determination policies 762 are employed to compute a computational security level for a computational resource based on the user security level of a user that is currently using the network within the data processing system. The examples of implementations of the present invention as shown in the figures are described as considering the user security level of a single user when computing a computational security level for a computational resource. However, it should be noted that the computational security level of a computational resource may be based upon the user security levels of multiple users, thereby aggregating the assessment of security risk that is posed by multiple users.

Figure 7C:
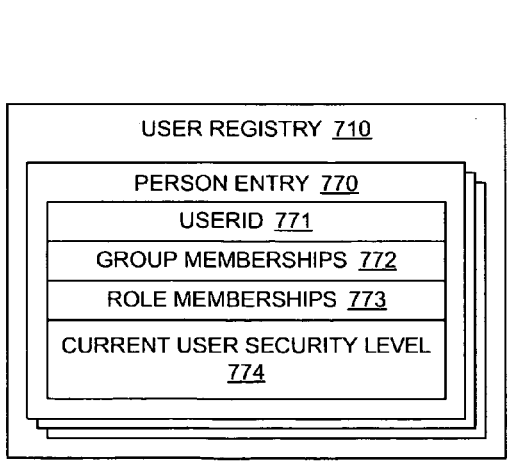

Referring now to FIG. 7C, additional detail is provided for some of the information that may be stored within user registry database 710. Each person that uses computational resources within a data processing system may be assumed to have a person entry within user registry database 710; person entry 770 contains information about a specific user. UserID 771 is a unique identifier that a person uses to perform authentication operations. Group memberships 772 indicate the groups to which the person belongs, such as a project, a corporate department, etc. Role memberships 773 indicate the types of roles that may be performed by the person, such as supervisor or supervised employee. User security level 774 is an indication of the current user security level of the person; user security level 774 may be represented by a numerical value or other type of data to provide an indication of a user security risk that has been assessed by examining the user's network-related activities. An initial user security level may be assigned to a user when person entry 770 is created; the initial user security level may be permanently stored in person entry 770 or elsewhere for use in certain circumstances, such as a system reset or other situations in which a default value is needed for the user security level of a given user.

Figure 7D:
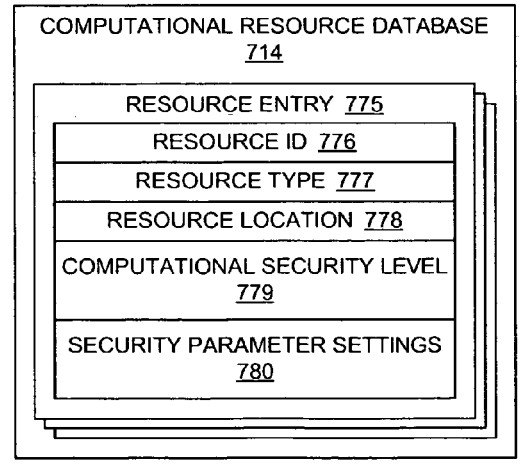

Referring now to FIG. 7D, additional detail is provided for some of the information that may be stored within computational resource database 714, which provides information about computational resources within the data processing system, such as laptop computers, desktop computers, printers, firewalls, and other hardware and software resources. Computational resource database 714 may contain an entry for each computational resource; resource entry 775 may contain resource ID 776, resource type indicator 777, and if applicable, resource location 778. Computational security level 779 is an indication of the current computational security level of the resource; computational security level 779 may be represented by a numerical value or other type of data to provide an indication of the security protection that is being applied against a resource to protect it from vulnerabilities that might be introduced via a network. When it is determined that the computational security level of a resource needs to be modified, then the security parameter settings 780 of the resource need to be modified in order to increase or lower the security level of the resource; information within computational resource database 714 may provide information that is required to select an appropriate policy that dictates the appropriate actions to be decided in order to determine whether the computational security level of a resource needs to be modified. An initial computational security level may be assigned to a resource when resource entry 775 is created; the initial computational security level may be permanently stored in resource entry 775 or elsewhere for use in certain circumstances, such as a system reset or other situations in which a default value is needed for the computational security level of a given resource.

Figure 7E:
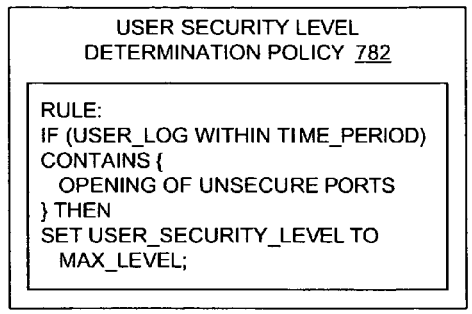

Referring now to FIG. 7E, user security level determination policy 782 is an example of one of user security level determination policies 761 that are shown in FIG. 7B. Policy 782 contains a single rule for setting the user security level indicator for a user to a maximum value if the log of the user activity within a certain time frame indicates that unsecure communication ports were opened, which could potentially allow malicious software or viruses to infect a device and thereby spread throughout a network.

Figure 7F:
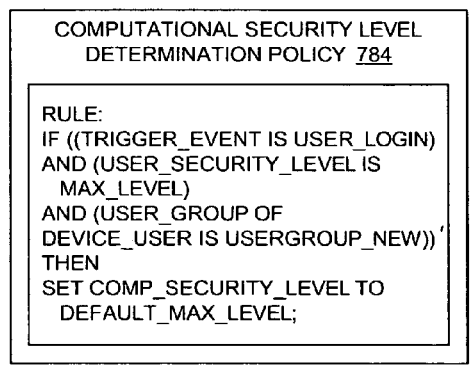

Referring now to FIG. 7F, computational security level determination policy 784 is an example of one of computational security level determination policies 762 that are shown in FIG. 7B. Policy 784 contains a single rule for setting the computational security level indicator for a particular device; in this example, the rule obtains information about the event that is triggering the evaluation of the rule, the level of risk that is posed by the user who triggered the event, and the type of user who is using the device for which the computational security level is being modified. The policy's rule checks that a user is logging onto the network and that this user possesses a high user security level; in addition, the rule checks that the user of the particular device has been flagged as belonging to a group of new users. If these conditions are true, then the computational security level of the device is set to a special default maximum level.

Figure 7G:
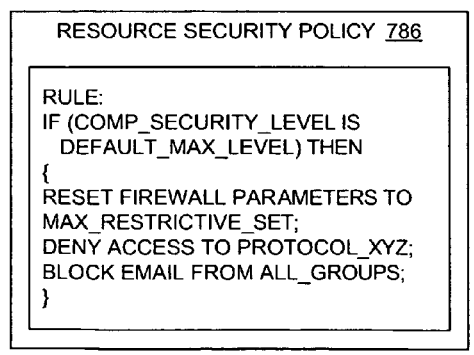

Referring now to FIG. 7G, resource security policy 786 is an example of one of resource security policies 753 that are shown in FIG. 7B. Policy 784 contains a single rule for setting various configurable security-related parameters of a particular device based on the computational security level that is currently assigned to the device, which in this example is set to a special default maximum level. The rule specifies that when the computational security level that is currently assigned to the device is equal to a special default maximum level, then various actions should be performed on the device to increase its ability to withstand attempts to thwart its security defenses. For example, the parameters of the firewall that executes on the device should be have its parameters set to their most restrictive values, thereby ensuring that the firewall is flagging and/or stopping any activity that may be slightly irregular. In addition, a certain communication protocol is rendered inaccessible or inoperable, thereby preventing the transfer of malicious code or preventing some other activity that is unacceptable under the current circumstances. Furthermore, all mail retrieval is blocked under the current circumstances, thereby prevent a user, particularly a novice user, from inadvertently accepting an email message with a malicious attachment.

Figure 8:
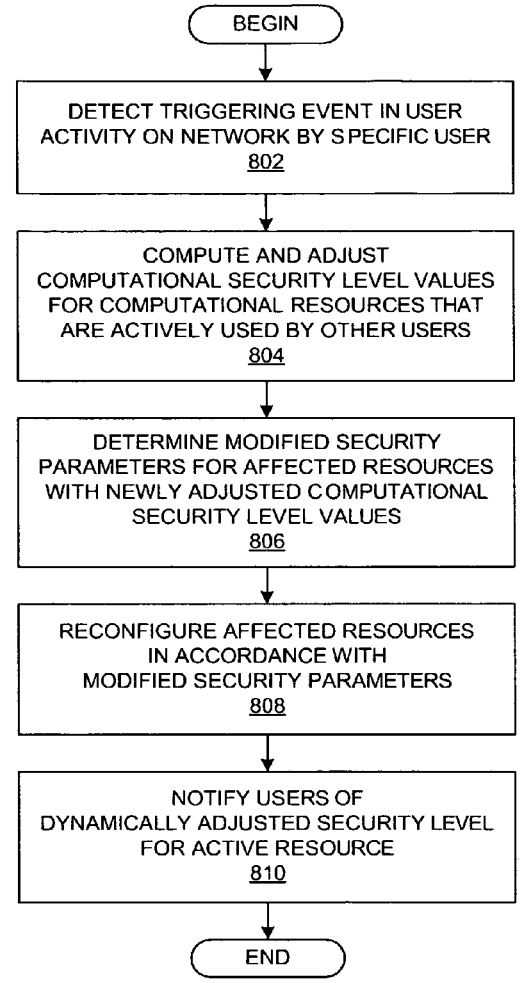
FIG. 8 depicts a flowchart that shows a process in which user activity on a network can trigger the dynamic adjustment of computational security level values for active resources within the network in accordance with an embodiment of the present invention.

With reference now to FIG. 8, a flowchart depicts a process in which user activity on a network can trigger the dynamic adjustment of computational security level values for active resources within the network in accordance with an embodiment of the present invention. The process that is shown in FIG. 8 depicts an update operation for the computational security level values of resources within a networked data processing system. However, a similar process would be performed for generating an initial value for the computational security level of a specific computational resource, e.g., by assigning a default computational security level value or by examining the user security levels of current users of the network when a computational resource is initialized.

The process commences by detecting a triggering event in the network activity of a specific user (step 802). It may be assumed that only a relatively small number of events, e.g., logon and logoff operations, are predetermined to be triggering events, thereby greatly reducing the frequency of performing the process that is shown in FIG. 8. In response, a re-evaluation is performed for the computational security level values for some computational resources that are actively being used by other users within the data processing system. The computational security level values of those resources are dynamically computed and/or adjusted and then assigned and/or stored (step 804). New and/or modified sets of security parameters for the affected resources are then determined based on the newly adjusted computational security level values (step 806).

The affected resources are then configured and/or reconfigured in accordance with the new or modified security parameters (step 808), after which the affected resources would operate in this fashion until their security parameters were again modified. The users who are using these affected resources with the dynamically adjusted computational security level values may be notified (step 810) because the user may notice that the resource begins to act with different behavior, thereby concluding the process.

The advantages of the present invention should be apparent in view of the detailed description that is provided above, but the processes that are shown in FIG. 5, FIG. 6, and FIG. 8 and the components that are shown in FIGS. 7A-7G can be related by means of an example. A first user, user "A", may be using various computational resources within a data processing system; in particular, user "A" may be employing a computer along with various resources that are supported on the computer, such as a firewall application, a mail application, an online chat application, and other applications. A user security level is associated with user "A", and a computational security level is associated with some of the computational resources that user "A" is using. While user "A" is employing those computational resources, any potentially problematic network activity of user "A" is logged for subsequent determination of a user security level for user "A", as described with respect to FIG. 5. Various network activity filtering policies may be used to determine the network operations that should be classified as potentially problematic network activity. The information within a centralized user log database is used to compute user security levels for users of computational resources within the data processing system, as described with respect to FIG. 6. Various user security level determination policies may be used to associate an appropriate user security level value to user "A".

At some point in time, user "B" may log onto the network, and since the logon operation signals the new presence of a user on the network, then the user security level for user "B" would be examined for the first time within the current time frame when the user logs onto the network. In other words, upon certain triggering events by a certain user, such as a logon operation by user "B", the user security levels are used to determine appropriate computational security levels for the computational devices that are being used by users, such as user "A", as described with respect to FIG. 8; other triggering events, such as a network logoff event, may have an opposite effect. In this example, user "B" may have an elevated user security level that indicates that user "B" has previously been associated with some problematic network activity. Using the logon operation of user "B" as a triggering event to re-evaluate the computational security levels of resources that are actively being used by user "A", various computational security level determination policies may be used to associate an appropriate computational security level value with any resource that is being used by user "A".

Furthermore, various resource security policies may be employed to determine an appropriate response for modifying the security of a resource to act in accordance with its newly assigned computational security level. For example, the computational security level of client 716, or more specifically, a firewall application, can be dynamically adjusted by dynamically reconfiguring firewall 724 with a modified set of firewall parameter settings 726. When determined to be necessary, e.g., as specified in a configurable policy, dynamic security level adjustment module 742 can send new firewall parameter settings 726 to client 716, e.g., via network security monitoring agent 718, via a mechanism in the firewall application, or via a mechanism in the operation system that supports client 716.

Network-related activity by user "B" may be deemed to be potentially problematic. In response, in order to protect the computational environment of user "A", certain computational defenses of the computational resources that are being used by user "A" may be elevated in order to protect the working environment of user "A". Although the behavior of user "B" could possibly be halted in some manner by modifying directly the computational activity of user "B", which would thereby protect the working environment of user "A", the present invention provides a unique solution.

It is important to note that while the present invention has been described in the context of a fully functioning data processing system, those of ordinary skill in the art will appreciate that some of the processes associated with the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

Certain computational tasks may be described as being performed by functional units. A functional unit may be represented by a routine, a subroutine, a process, a subprocess, a procedure, a function, a method, an object-oriented object, a software module, an applet, a plug-in, an ActiveX™ control, a script, or some other component of firmware or software for performing a computational task.

The descriptions of elements within the figures may involve certain actions by either a client device or a user of the client device. One of ordinary skill in the art would understand that requests and/or responses to/from a client device are sometimes initiated by a user and at other times are initiated automatically by a client, often on behalf of a user of the client. Hence, when a client or a user of a client is mentioned in the description of the figures, it should be understood that the terms "client" and "user" can often be used interchangeably without significantly affecting the meaning of the described processes.

The descriptions of the figures herein may involve an exchange of information between various components, and the exchange of information may be described as being implemented via an exchange of messages, e.g., a request message followed by a response message. It should be noted that, when appropriate, an exchange of information between computational components, which may include a synchronous or asynchronous request/response exchange, may be implemented equivalently via a variety of data exchange mechanisms, such as messages, method calls, remote procedure calls, event signaling, or other mechanism.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computer-implemented method for securing operations with respect to a set of computational resources in a data processing system, the method comprising:

employing a first set of computational resources on a first computational device that is being used by a first user, wherein a first user security level indicating value is associated with the first user;

assigning a first computational security level indicating value to the first set of computational resources on the first computational device;

monitoring network activity with respect to a second set of computational resources that is used on a second computational device by a second user;

employing a first configurable policy that indicates first rules and conditions for filtering the network activity;

filtering the network activity with respect to the second set of computational resources that are used by the second user;

logging problematic network activity with respect to the second set of computational resources that are used by the second user;

examining the logged problematic network activity of the second user;

employing a second configurable policy that indicates second rules and conditions for determining a second user security level indicating value;

determining the second user security level indicating value based on information from the logged problematic network activity;

employing the second set of computational resources on the second computational device that is being used by the second user, wherein the second user security level indicating value is associated with the second user; and employing a third configurable policy that indicates third rules and conditions for adjusting the first computational security level indicating value for the first set of computational resources on the first computational device;

adjusting the first computational security level indicating value for the computational resource on the first computational device in response to detected network activity by the second computational device that is being used by the second user;

employing a fourth configurable policy that indicates fourth rules and conditions for determining modified security-related parameters for reconfiguring the first set of computational resources on the first computational device;

determining modified security-related parameters for reconfiguring the first set of computational resources on the first computational device based on the first computational security level indicating value;

automatically reconfiguring the first set of computational resources on the first computational device based on the second user security level indicating value of the second user; and notifying the first user of the reconfiguration of the first set of computational resources on the first computational device.

* * * * *

UNITED STATES PATENT AND TRADEMARK OFFICE
CERTIFICATE OF CORRECTION

PATENT NO. : 7,627,893 B2 Page 1 of 1
APPLICATION NO. : 11/255153
DATED : December 1, 2009
INVENTOR(S) : Corley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1077 days.

Signed and Sealed this

Second Day of November, 2010

David J. Kappos
*Director of the United States Patent and Trademark Office*